(No Model.) 2 Sheets—Sheet 1.
H. HINCKLEY.
SLACK ADJUSTER FOR CAR BRAKES.
No. 496,606. Patented May 2, 1893.
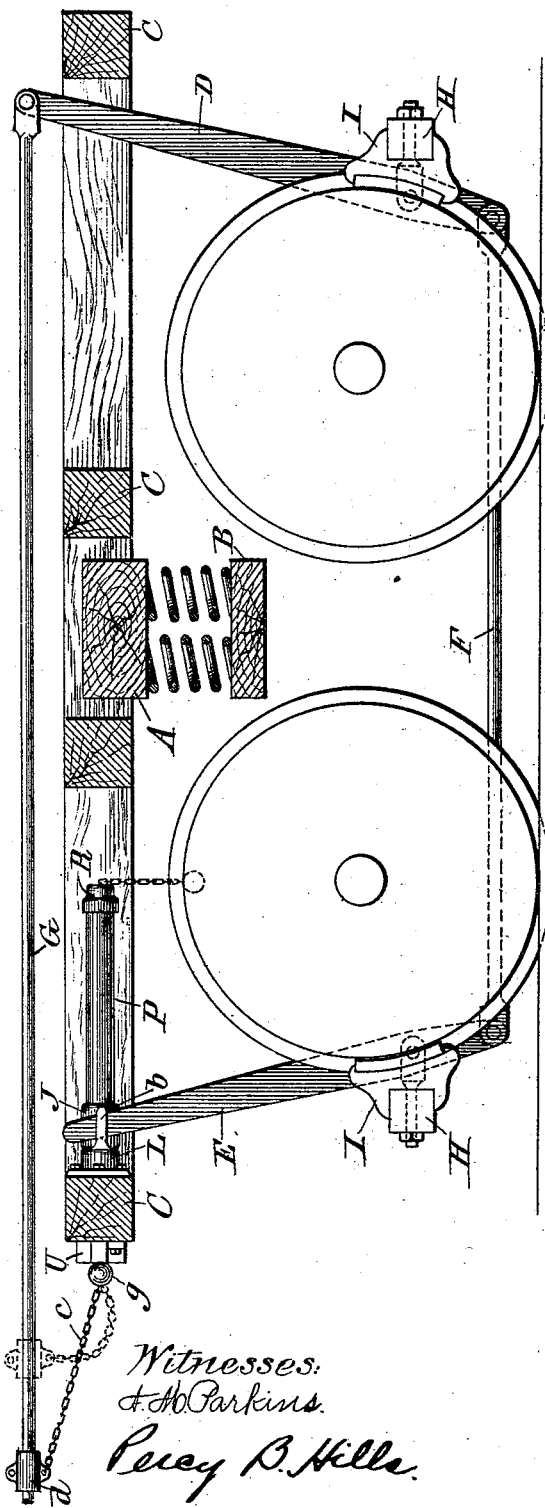
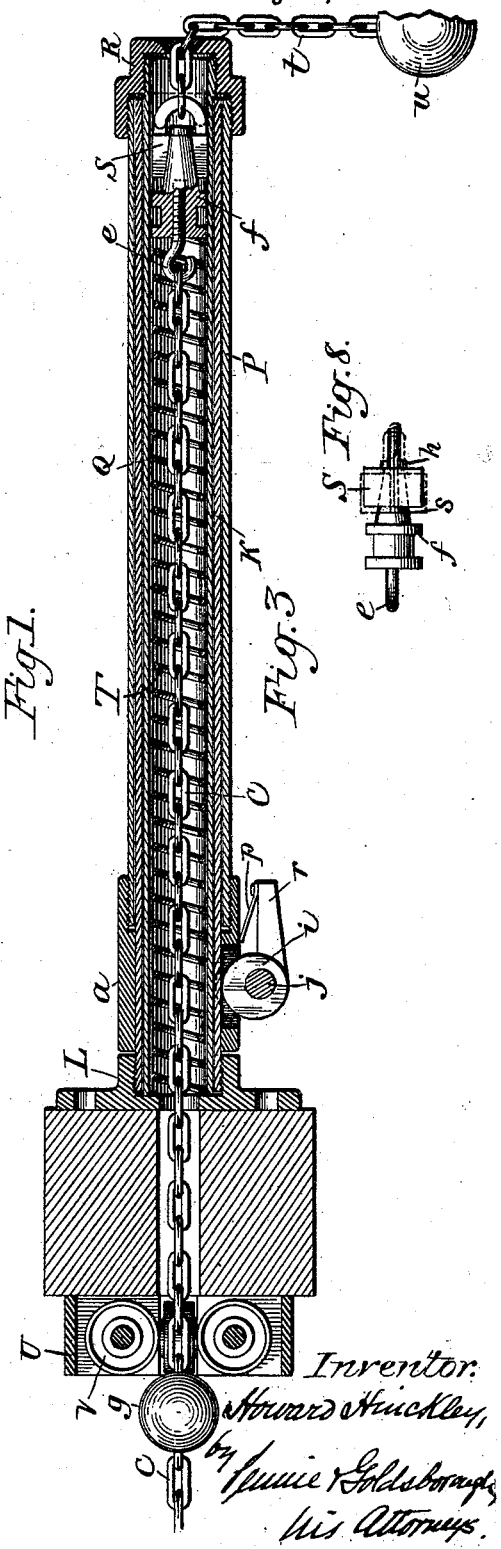
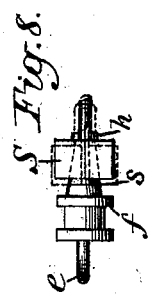
Witnesses:
J. H. Parkins.
Percy B. Hills.
Inventor:
Howard Hinckley,
by Lewis & Goldsborough
his Attorneys.
THE NORRIS PETERS CO., PHOTO-LITHO., WASHINGTON, D. C.

(No Model.) 2 Sheets—Sheet 2.
H. HINCKLEY.
SLACK ADJUSTER FOR CAR BRAKES.
No. 496,606. Patented May 2, 1893.
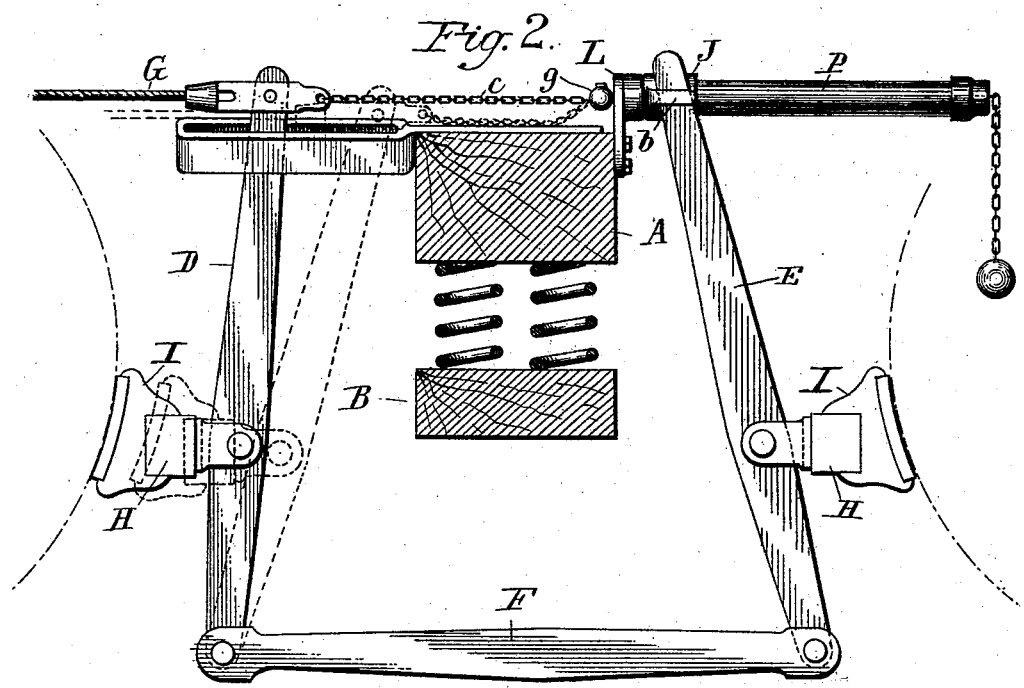
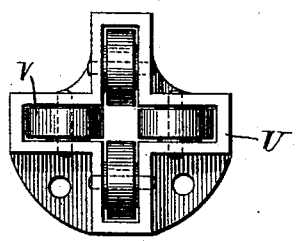
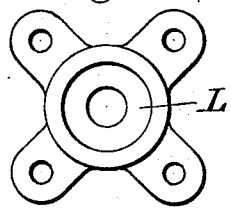
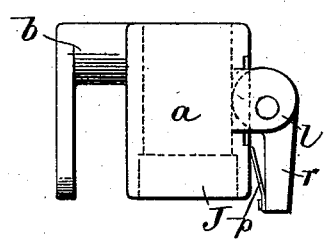
Witnesses:
A. H. Parkins.
Percy B. Hills.
Inventor,
Howard Hinckley,
by Pennie & Goldsborough,
his Attorneys.

UNITED STATES PATENT OFFICE.

HOWARD HINCKLEY, OF TRENTON, NEW JERSEY.

SLACK-ADJUSTER FOR CAR-BRAKES.

SPECIFICATION forming part of Letters Patent No. 496,606, dated May 2, 1893.

Application filed September 26, 1892. Serial No. 446,921. (No model.)

*To all whom it may concern:*

Be it known that I, HOWARD HINCKLEY, a citizen of the United States, residing at Trenton, in the county of Mercer and State of New Jersey, have invented certain new and useful Improvements in Slack-Adjusters for Railway-Car Brakes; and I do hereby declare the following to be a full, clear, and exact description of the invention, such as will enable others skilled in the art to which it appertains to make and use the same.

The present invention has reference to devices for automatically taking up the slack in railway car brake systems, and relates more particularly to that class of devices wherein the adjustment is effected by shifting the fulcrum of the dead lever, as in my application filed August 22, 1890, Serial No. 362,715, and my patent No. 465,266, granted December 15, 1891.

In the invention embraced in the application and patent above referred to, a windlass shaft is journaled upon the truck or framing of the car, and a flexible chain connection extends from the shaft to the end of the dead lever, the connection between the lever and the chain constituting the fulcrum for the lever. In combination with this arrangement, means are provided whereby the shaft will be operated upon the application or release of the brakes to wind up or shorten the chain connection, thereby shifting the fulcrum point of the dead lever, and thus compensating for the slack motion caused by the wearing away of the brake shoes against the wheels.

In the present invention, the windlass shaft and its chain connection with the dead lever are dispensed with, and a movable fulcrum block or sleeve, carrying a guide or keeper for the end of the dead lever, is arranged to be moved into various positions of adjustment along a guide rod or support, the guide rod being preferably tubular or hollow for the purpose of housing and concealing the mechanism for securing the automatic adjustment of the block.

In the accompanying drawings, forming part of this specification, Figure 1 is a side elevation showing my invention in connection with one arrangement of brake levers. Fig. 2 is a similar view illustrating the same in connection with a slightly different arrangement of levers. Fig. 3 is a longitudinal central section of the immediate devices for shifting the fulcrum of the dead lever. Fig. 4 is a face view of a bracket carrying friction rollers, which is used in connection with the arrangement shown in Fig. 1. Fig. 5 is a view of a casting to which the tubular guide rod or support is secured when arranged as shown in Fig. 1. Fig. 6 is a side view of the adjustable fulcrum block or sleeve; and, Fig. 7 shows different views of the split grip-block and hook which co-operate with the inner tube or the adjuster; and Fig. 8 is a detail view of the grip.

The same letters of reference indicate corresponding parts in the several views.

Referring to Figs. 1 and 2, A denotes the bolster, B the spring plank, and C the framing of the truck.

D indicates what is known as the live lever, and E denotes the dead lever, so called.

F indicates the connecting rod or pitman, connecting the lower ends of the brake levers D and E together, and G is the draft rod or rope by means of which the live lever is operated from the piston of the air cylinder, the diaphragm of the vacuum chamber, or whatever other brake applying power is employed.

H denotes the brake beams, and I the shoes, the brake levers in the arrangement illustrated in Fig. 1 being located so that the shoes bear on the outer sides of the wheels, and in Fig. 2 the arrangement being like that shown in my patent, above referred to, where the shoes bear on the inner sides of the wheels.

The construction, location, and arrangement of the parts thus far described are common in brake systems of the present day, and require no further description or explanation to enable their working to be understood.

J indicates the adjustable fulcrum block for the dead lever. In the present improvement, it is in the form of a sleeve $a$, having an off-set horn or keeper $b$, against which the upper end of the lever bears, and which constitutes the fulcrum proper for the lever. This block is sleeved upon a guide rod or support K, firmly secured at one end to a plate bracket L, which is bolted to one of the sills of the truck, as in Figs. 1 and 2, or to the truck frame, as in Fig. 3. In the form of the invention herein illustrated, the guide rod is tubular, being composed of a short length of ordinary boiler tubing, and is secured to the plate bracket by being tapped into a socket formed in or upon the same. It may, however, be otherwise constructed, and may have any preferred form in cross section, these being matters of detail subordinate to the general invention. The upper end of the dead lever E rests against the off-set b on the fulcrum block J, which constitutes the fulcrum proper against which the lever re-acts in the application of the brakes, as is well understood. For the purpose of shifting the position of this fulcrum to compensate for the slack motion, the block is automatically adjusted along the guide rod or support by means which I will now describe.

In order to shift the fulcrum block by devices operating from the inside of the tube, so that they may be housed and protected from dirt and injury, I pass a tube or pipe P of slightly larger diameter than the hollow guide rod over the latter, and secure the inner end of the same to the forward end of the fulcrum block or sleeve, so that the outer pipe and the sleeve will slide together on the tubular guide rod. I also arrange a smaller tube or pipe Q to slide within the guide, as shown in Fig. 3, and I connect the inner tube Q and the outer tube or casing P rigidly together at their forward ends by means of a cap-piece or cover R, so that the two tubes and the fulcrum sleeve will move together as one device. The outer tube and the cap-piece form the connection between the fulcrum block L and the inner tube Q, and the latter forms the connection between the outer tube P and a sliding grip-block S, arranged within the barrel of the inner tube, and operated by a spring and connections with the brake rod, or other part of the brake applying mechanism, to grip the tube interiorly, for the purpose of forcing the same and the outer tube P and fulcrum block J outwardly along the tubular guide rod K as the slack motion increases, as will now be more particularly described.

The letter c indicates a chain connected at one end to a clamp d, adjustably secured to the brake rod G, or other part of the brake applying devices, said chain being extended into the rear end of the tubular guide rod, and having its opposite end attached by hook e or other convenient means to a plug f fitting and sliding loosely within the barrel of the inner tube Q. A stout coil spring T is also arranged within the inner tube around the chain, and re-acts between the plate bracket or the sill or bolster at its rear end and the plug f at its front end, the tension of the spring acting to tighten the chain immediately upon the release of the brakes and to force the plug outward toward the end of the tube. A stop g, here shown as a ball, (though it may be a pin or any other device for the purpose) is attached to the chain at any suitable point, the object being to prevent the spring from forcing the plug out of the end of the tube and to limit the passage of the chain into the same.

S denotes a cylindrical grip-block connected with the plug f so as to slide freely therewith through the tube in one direction, but arranged to grip the inner wall of the tube as the plug is moved in the opposite direction, and to cause the tube to move with it, and carrying also the outer tube P and the fulcrum sleeve J, thus moving the fulcrum for the dead lever farther out along the tubular guide rod or support. This grip-block is of slightly smaller diameter than the interior of the tube, so as to slide easily therethrough, but is split longitudinally into sections (preferably halves, as shown in Fig. 7, though it may be divided into any number of sections) so as to be expansible for the purpose of gripping the inner surface of the tube, and carrying the latter with it when forced outward or in the opposite direction by the spring.

The construction of the grip-block, and the connection between the same and the sliding plug, are shown in detail in Figs. 7 and 8, and are as follows: The plug f has a long tapering or conical shank or stem s, provided with a button or head h at its forward smaller end. The grip-block is bored out centrally in conical or tapering form to correspond with the shape of the plug stem, and the sections of the grip are fitted upon and clasped around the shank before inserting the plug in the tube. When the parts are thus put together, and the plug is inserted to place in the tube, the grip block has a certain amount of play upon the shank, this being sufficient to permit the wedging action of the tapering shank to expand the sectional grip-block sufficiently to cause it to bite or grip the inner wall of the tube. The grip block is prevented from slipping off the small end of the shank by means of the head h. It will be understood from this construction that when the brakes are applied the chain c is tightened, and the plug and grip-block are pulled toward the inner end of the tube, the tapering shank of the plug freeing itself from the bore of the grip block, and permitting the latter to loosen its hold on the walls of the tube and to slide freely backward with the plug. When the brakes are released the chain is loosened, as indicated in dotted lines in Figs. 1 and 2, and the expansion of the spring tends to force the plug and grip block toward the outer end of the tube. The wedging action of the tapering shank in the initial movement of the plug expands the sections of the grip-block and causes them to grip or bite the inner wall of the tube, thereby locking the block, the plug, and the tube firmly together, and causing them to move the outer tube and the fulcrum sleeve outward along the intermediate tube or guide J under the continued action of the expanding spring, and thus adjusting the fulcrum of the dead lever to a new position.

In order to hold the fulcrum sleeve in its different positions of adjustment, and to prevent it from being forced back by the pressure of the dead lever, or being pulled back as the spring is compressed to give the grip a new hold on the inner tube, I provide the sleeve with a releasable locking device consisting of an eccentric $i$ journaled upon a pintle $j$ fixed in ears $l$ depending from the under part of the sleeve at the sides. The sleeve is cut away on the under side, as shown in Fig. 3, so that the eccentric may engage the tubular guide rod, and lock the sleeve against backward movement on the tubular support or guide. A spring $p$ fastened to an arm $r$ of the eccentric bears on the under side of the sleeve, thereby holding the eccentric normally in engagement with the guide rod, but permitting the free outward movement of the sleeve, and at the same time acting to automatically lock the parts so that retrograde movement of the sleeve on the guide is impossible, except when the lock is released for the purpose of resetting the adjustment.

It will be understood that the thrust of the spring maintains the engagement of the grip with the tube by forcing the sections apart. When it is desired to reset the brakes or renew the shoes, it is of course necessary to set the adjuster back to its starting position. This cannot be done, however, till the grip has been released. In order to do this I connect to the front end of the grip block a chain $t$, the forward end of which extends loosely through an opening in the cap piece, as shown in Fig. 2, and is allowed to hang freely where it can be reached by hand. A weight or ball $u$ is preferably attached to the end of the chain to prevent it from becoming entangled and to hold it down in accessible position. The hold of the grip on the inner wall of the tube can be easily loosened by means of this device, it being only necessary to take hold of the chain and pull the grip block S toward the outer end of the tapering shank of the plug $f$, when the sections will contract and permit the tube to be slid back. In order to reset the adjustment it is also necessary to release the locking eccentric, which can be readily done by knocking up the arm and compressing the spring $p$ which disengages the eccentric and permits the inner and outer tubes and the sleeve to be shoved back.

In Figs. 1 and 3 the position of the brake levers is such that the fulcrum point comes about on a line with the truck frame. In this arrangement I therefore bolt the plate bracket to the frame centrally of the width of the same, and provide an opening in the frame for the chain $c$ to pass through. In this construction I bolt a bracket U to the opposite side of the frame, said bracket being provided with an opening corresponding with the opening in the frame, and carrying friction rollers $v$ surrounding the opening as shown. The object of this arrangement of rollers is to permit the free running of the chain. In the arrangement of levers shown in Fig. 2 no such provision is necessary, owing to the fact that the fulcrum point of the lever is above the bolster, so that there is nothing to interfere with the free motion of the chain.

In practicing this invention I do not intend to confine myself always to the details of the construction herein illustrated and described, and I therefore wish to be understood as not limiting the scope of the claims herein to these details.

Having thus described my invention, what I claim, and desire to secure by Letters Patent, is—

1. The combination of an adjustable fulcrum block, a guide rod or support therefor, a spring for moving the block outward along the guide, a releasable lock for holding the block in different positions of adjustment, and a connection between the spring and the brake applying mechanism, whereby the spring is compressed upon the application of the brakes, and released and permitted to operate to move the block outward as the brakes are released, substantially as described.

2. The combination of an adjustable fulcrum sleeve, a tubular guide rod or support, a spring actuated grip inclosed within the barrel of the guide rod for moving the block outward along the guide, a releasable lock carried by the sleeve for engaging the guide and holding the sleeve in different positions of adjustment, and a connection between the grip and the brake mechanism, whereby the spring is compressed when the brakes are applied, and released when the brakes are slackened causing the grip to be thrown into action to move the sleeve outward, substantially as described.

3. The combination of the fixed tubular guide or support K, the adjustable fulcrum sleeve sliding thereon, the tube P connected to the sleeve, and the tube Q sliding within the fixed tube K, and connected at its outer end to the exterior tube P, substantially as described.

4. The combination of a tubular guide or support K, and an adjustable fulcrum sleeve J sliding thereon, a tube P surrounding the tube K and connected to the sleeve, a tube Q sliding within the fixed tube K, and connected at its outer end to the outer tube P, and means inclosed within the barrel of the tube Q for adjusting the sleeve along the fixed tubular support, substantially as described.

5. The combination of a fixed tubular guide rod or support K, a fulcrum sleeve J sliding thereon, a tube P surrounding the fixed tube and connected to the sleeve, a tube Q sliding within the fixed tube K, and connected at its outer end to the exterior tube P, means inclosed within the barrel of the tube Q for adjusting the sleeve along the tubular guide, and a releasable lock to hold the sleeve in different positions of adjustment, substantially as described.

6. The combination of the fixed guide or tube K, the fulcrum sleeve J arranged to slide thereon, the tube P surrounding the tubular guide and connected to the sleeve, and the tube Q sliding within the fixed tube K, and connected at its outer end to the exterior tube P, and a spring actuated grip device inclosed within the tube Q, for adjusting the latter and the outer tube and sleeve with respect to the fixed guide tube, substantially as described.

7. The combination of the fixed tubular guide or support K, the fulcrum sleeve adjustable thereon, the tube P inclosing the guide K and connected to the sleeve, the tube Q sliding within the fixed tube K and connected at its outer end to the exterior tube P, a spring actuated grip device inclosed within the inner tube, and a connection between the grip and an element of the brake applying mechanism, substantially as described.

8. The combination of the fixed tube K, the outer tube P carrying the fulcrum for the lever, the inner tube Q connected with the tube P, the spring T inclosed within the tube P the plug $f$ connected to the chain $c$, the expansible grip S connected to the plug, and the chain $t$ connected to the grip, substantially as described.

9. The combination of the tube Q, the plug $f$, arranged to slide therein, the spring T tending to force the plug outward, the chain $c$ by means of which the spring is compressed and the plug drawn backward, and the sectional grip S mounted on the tapering stem of the plug, substantially as described.

10. The combination of the tube P, the plug $f$ having a tapering stem $s$ provided with a head $h$, with the cylindrical grip S formed in sections having a tapering bore, said sectional grip being arranged to fit the stem of the plug with capacity for a limited sliding movement thereon, substantially as described.

11. The combination of the tube P, the plug $f$ having a tapering stem $s$ provided with a head $h$, the cylindrical grip S formed in sections having a tapering bore and arranged to fit the stem of the plug with capacity for a limited sliding movement thereon, the spring T, and the chain $t$ connected to the grip, substantially as described.

12. The combination of the brake rod, or other movable element of the brake applying mechanism, the chain $c$ attached thereto, the fixed tubular guide or support K, the fulcrum sleeve adjustable thereon, the tube P inclosing the guide K and connected to the sleeve, the tube Q sliding within the fixed tube K and connected at its outer end to the exterior tube P, a spring actuated grip device inclosed within the inner tube, said grip device being connected with the chain $c$, and the chain $t$ connected with the grip block, substantially as described.

In testimony whereof I affix my signature in presence of two witnesses.

HOWARD HINCKLEY.

Witnesses:
WM. A. EASTERDAY,
PERCY B. HILLS.